United States Patent [19]

Wallick et al.

[11] 4,373,431
[45] Feb. 15, 1983

[54] APPARATUS FOR APPLYING A GRILL STRIPE TO A MEAT PRODUCT

[75] Inventors: William P. Wallick, 7478 W. 10th Ave., Lakewood, Colo. 80215; George A. Gauthier, Arvada, Colo.

[73] Assignee: William P. Wallick, Lakewood, Colo.

[21] Appl. No.: 214,187

[22] Filed: Dec. 8, 1980

[51] Int. Cl.³ ............................................. A47J 37/00
[52] U.S. Cl. ........................................ 99/483; 99/386; 99/388; 101/7; 101/40; 198/415; 426/383; 426/520
[58] Field of Search .............. 99/386, 339, 388, 404, 99/355, 407, 483, 408, 443 C; 426/383, 37, 520, 523; 101/40, 7; 219/388; 198/415, 384; 118/59

[56] References Cited

U.S. PATENT DOCUMENTS

| | | | |
|---|---|---|---|
| 2,243,137 | 5/1941 | Vaughn | 99/441 |
| 2,244,670 | 6/1941 | Benedict | 99/441 |
| 2,625,098 | 1/1953 | Robbins et al. | 101/40 |
| 2,703,047 | 3/1955 | Scherer et al. | 101/40 |
| 3,557,933 | 1/1971 | Sopher | 198/415 |
| 3,917,445 | 11/1975 | Suva et al. | 219/388 |
| 4,026,201 | 5/1977 | Fetzer | 99/355 |
| 4,089,260 | 5/1978 | Brown et al. | 99/388 |

*Primary Examiner*—Robert W. Jenkins
*Assistant Examiner*—Timothy F. Simone
*Attorney, Agent, or Firm*—Gregg I. Anderson

[57] ABSTRACT

An apparatus for placing a grill stripe or score mark on a meat product by transporting the meat product against a heated grill. A continuous conveyor transports individual wieners along a path of conveyance. A belt conveyor raises the wieners above the supported path of the continuous conveyor and into rotational contact with the superimposed heated grill. The wieners are rotated one complete revolution against the grill while synchronously moving the wiener with the continuous conveyor. The wieners are returned to the continuous conveyor for further processing.

23 Claims, 10 Drawing Figures

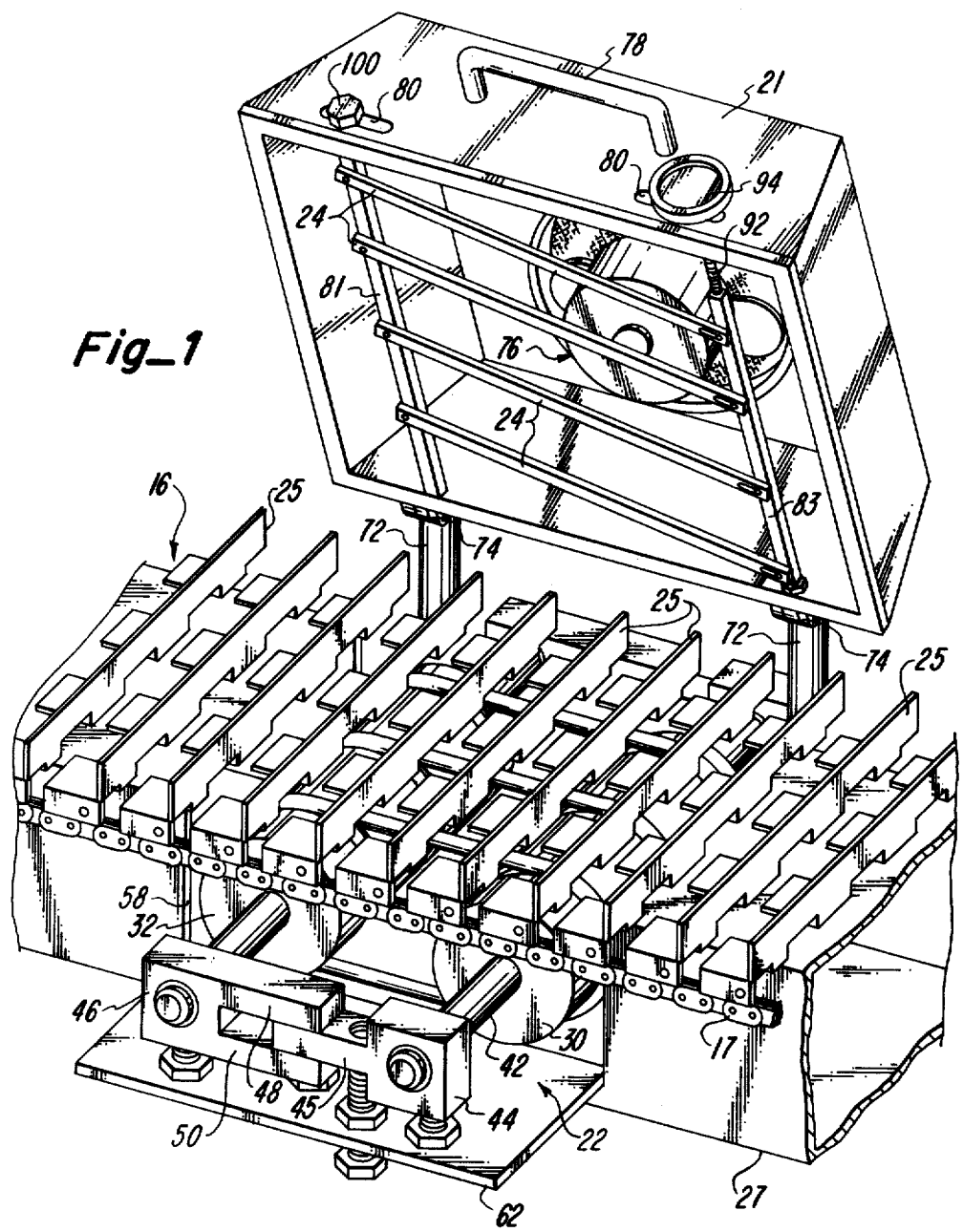
Fig_1

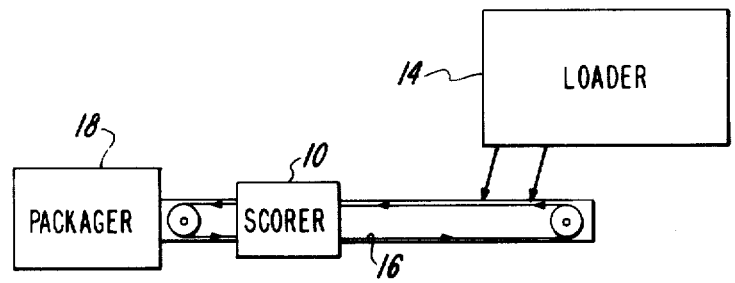
Fig_2
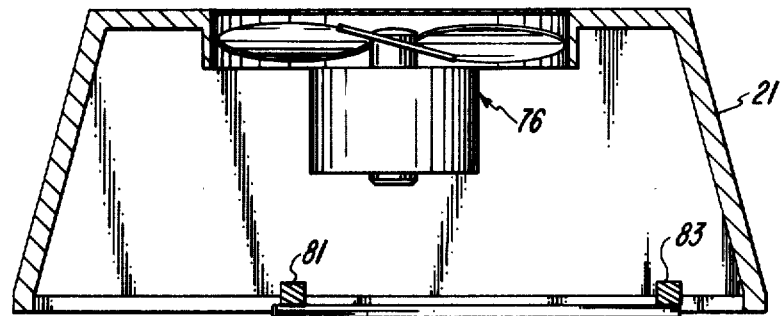
Fig_3
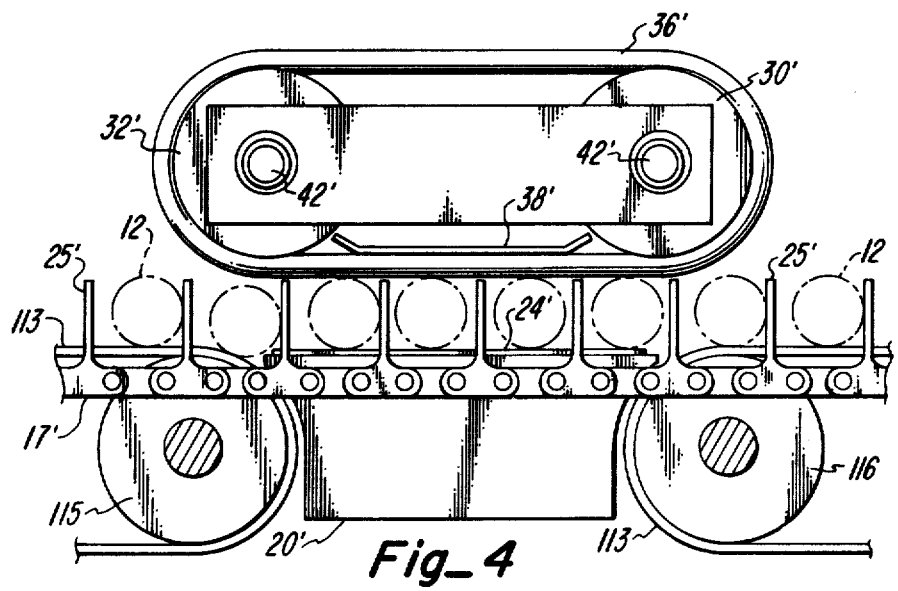
Fig_4

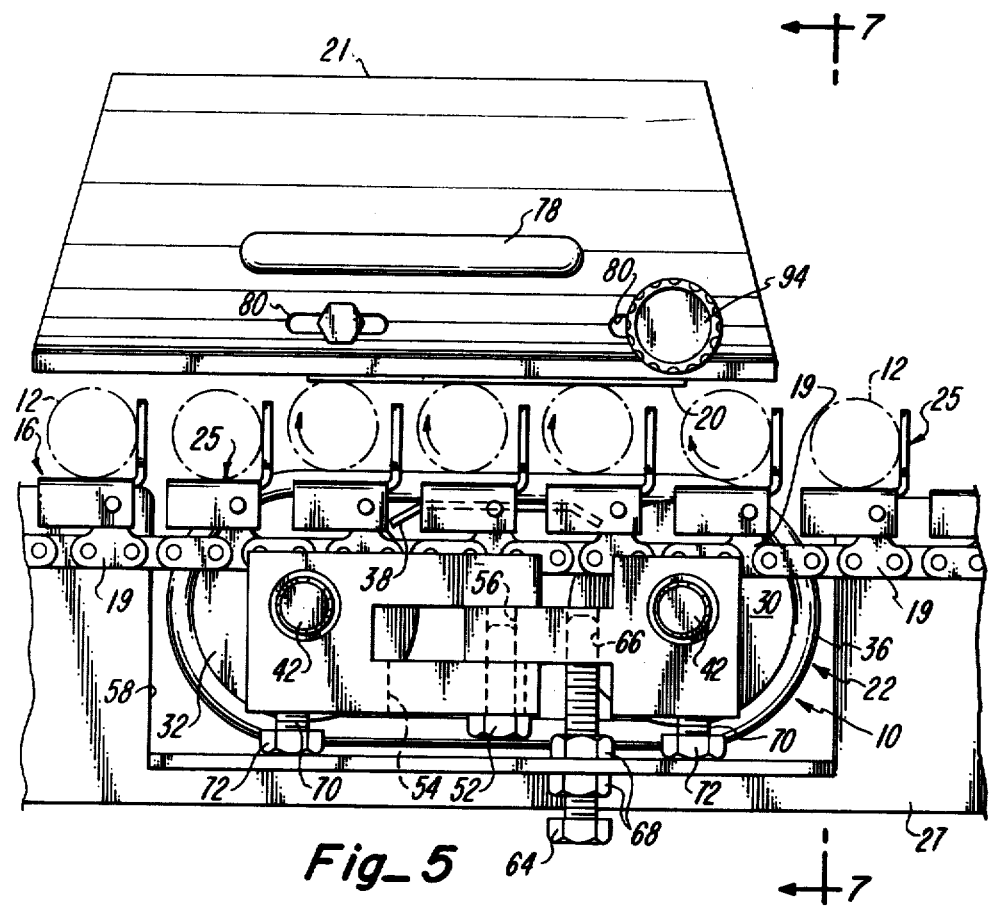
Fig_5
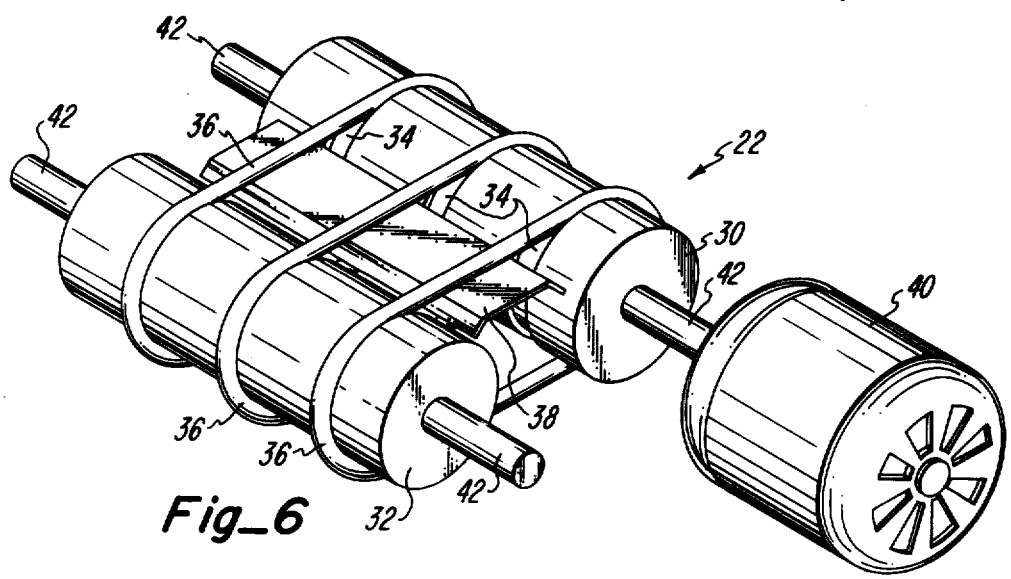
Fig_6

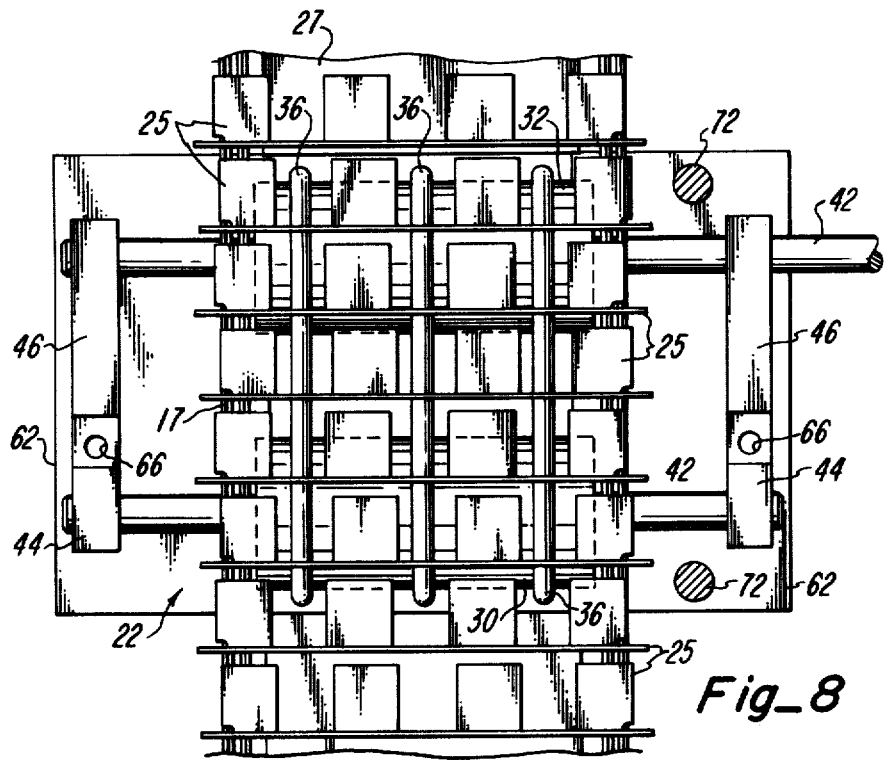
Fig_8
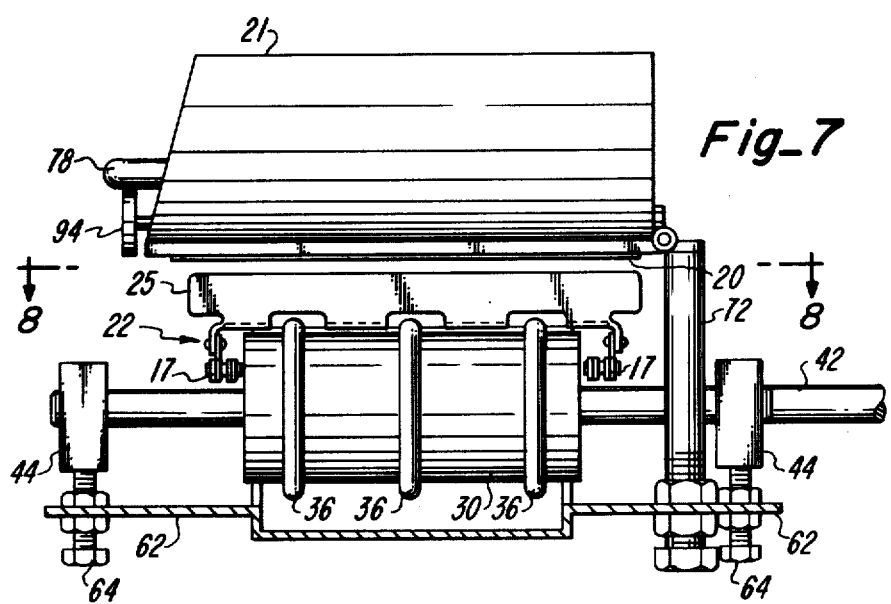
Fig_7

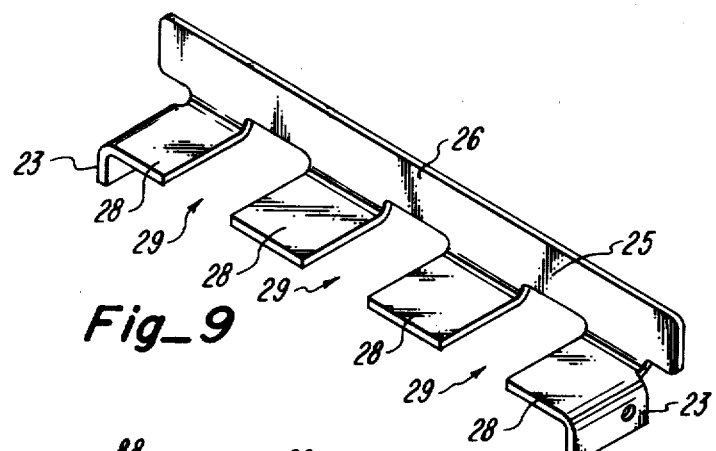
Fig_9
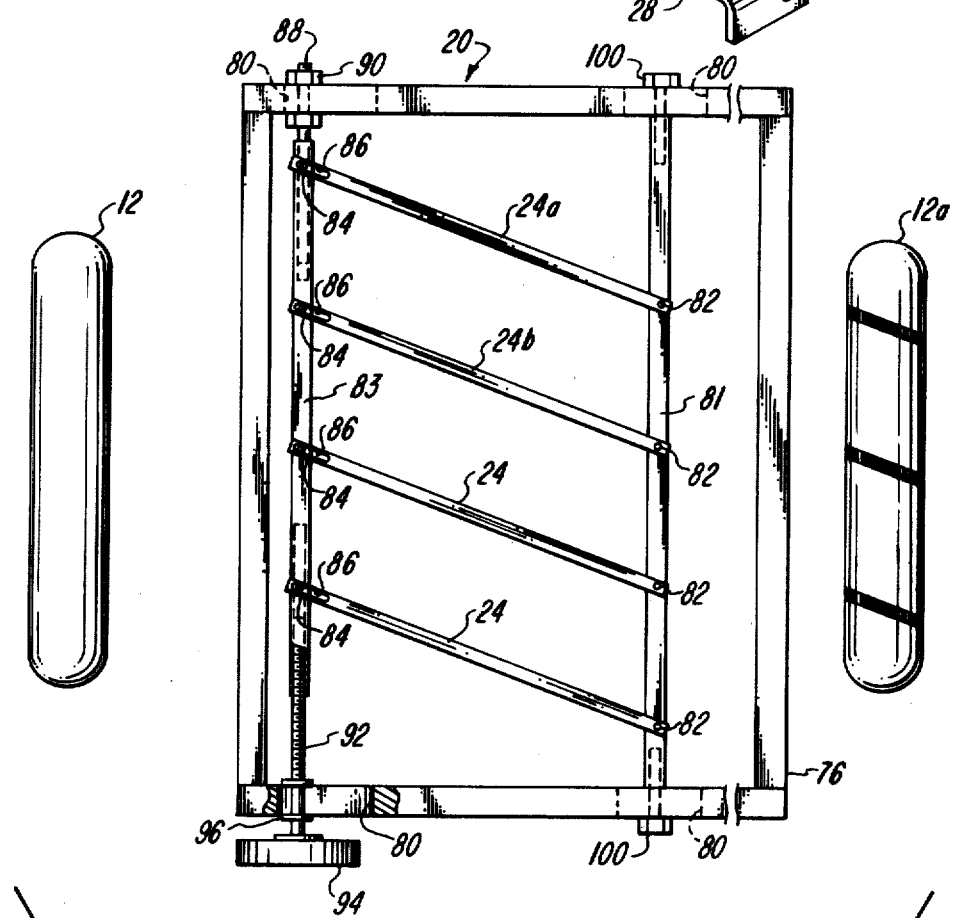
Fig_10

APPARATUS FOR APPLYING A GRILL STRIPE TO A MEAT PRODUCT

BACKGROUND OF THE INVENTION

1. Field of the Invention

This invention relates to conveyor systems for changing the attitude of a conveyed item relative to a conveyed path. More particularly, the invention relates to conveyor systems that convey an item having a position characteristic and rotating the item while simultaneously changing the elevation of successive items.

2. Brief Description of the Prior Art

Wieners have become an increasingly large portion of an individual's diet. The fact that wieners utilize nutritionally valuable portions of meat producing animals that would otherwise go to waste results in both decreased cost to the consumer as well as increased utilization of a particular animal. In times of rising costs and decreasing supply, these objectives are important to society as a whole.

Wieners are often pictorially advertised, in photographs and on television, as having a continuous spiral grill stripe or score mark around the circumference thereof. In fact, though tremendously appealing to the eye, there is no currently known method or apparatus for producing a wiener product that has such a grill stripe. It is also not feasible for a consumer to make such a grill stripe using an outdoor grill or barbecue. This is because an outdoor barbecue cooks through burning coals or gas heat. The cooking area of the grill or barbecue therefore is uniformly hot. The steel members forming the grill itself are not necessarily hotter than the surrounding air space. Therefore, no, or little apparent, score or grill mark is placed upon the wiener when it is grilled outdoors.

Steak meat products do take a grill or score mark from a grill or barbecue, which does enhance their appearance and desirability. This does not occur with a wiener because of the nature of the wiener itself. The shape and homogeneous content of the wiener make it difficult to place any kind of mark on the wiener without burning the wiener.

Cooking by applying electrical current to a highly resistant wire is of course well known. Convection ovens, toasters and many other household appliances use radiated heat to cook in this manner. None of these appliances are directed toward utilizing the heat in the resistant wires to place a grill stripe on the item being cooked for purposes of enhancing its appearance.

The consumer of wieners, or other meat products, is not likely to go to any additional trouble just to place a grill stripe on a meat product. It is also virtually impossible for a consumer to place a continuous grill mark around the circular wiener, which is the most asthetically appealing appearance the wiener can make.

Though wieners have been advertised as having a continuous grill stripe around their circumference, no such product is currently known to be available. If such a product were available, it could cheaply be manufactured by placing the grill stripe on the wiener after production and during the packaging process.

Continuous conveyors utilized for transporting wieners during the packaging process are currently well known. Such conveyors consist of a pair of parallel continuous chains having support members or carriages mounted thereon to convey individual wieners from a loader to a packaging machine.

SUMMARY AND OBJECTS OF THE INVENTION

The principal object of the present invention is to make meat products more appetizing and visually appealing to the consumer by providing an apparatus adapted to apply a grill stripe thereto.

It is a further object of the present invention to provide apparatus for placing a continuous grill strip on a meat product while the meat product is being conveyed within a meat product production facility.

It is a related object of the present invention to provide a method for placing a continuous grill stripe on a meat product.

It is still another object of the present invention to place a continuous grill stripe on a meat product without increasing the production costs or reducing efficiency of presently available equipment.

In accordance with the objects of the invention, a meat scorer includes a heated grill superimposed over a continuous conveyor and a belt conveyor vertically adjacent below said grill and said continuous conveyor. Individual wire members of the grill are heated to a temperature sufficient to mark or score a meat product, like a wiener. Excess radiated heat is drawn away from the grill and out the top of a hood, which hood contains and supports the grill.

The belt conveyor has continuous belts rotatably mounted between a pair of cylindrical rollers. The belts protrude above the continuous conveyor at the position where meat products are supported. The meat product is therefore raised by the belt conveyor to a position above its supported position on the continuous conveyor and into contact with the grill. When the meat product is a wiener, the belt conveyor rotates the wiener against the grill while simultaneously conveying the wiener along the path of travel of the continuous conveyor. The wiener is rotated one complete revolution while in contact with the grill and then placed back on the continuous conveyor for further processing.

The grill of the meat scorer is adjustable as to the angle the individual wire members make with the path of the continuous conveyor, as well as being adjustable with respect to the extent to which the grill itself overlaps the distance travelled by the belts of the belt conveyor. The latter adjustment provides for variation of the length of conveyor travel over which the wiener is contacted by the heated grill. Angular adjustment of the individual grill members insures that over a given length of contact, the score or grill stripe made by one individual grill member is matched with the grill stripe made by the next adjacent grill members.

BRIEF DESCRIPTION OF THE DRAWINGS

FIG. 1 is a fragmentary perspective view of the belt conveyor and raised grill of the meat scorer of the present invention mounted in-line with a continuous conveyor.

FIG. 2 is a schematic elevational view of a conventional loading and packaging operation utilizing the present invention.

FIG. 3 is a full section elevational view of a hood of the present invention with a fan mounted thereon.

FIG. 4 is a fragmentary side elevational view of an alternative embodiment of the present invention.

FIG. 5 is a fragmentary side elevational view of the meat scorer of the present invention mounted along the continuous conveyor, the grill of the present invention being in a production position and wieners being shown by phantom line.

FIG. 6 is a perspective view of the belt conveyor of the present invention, the continuous conveyor, grill and support for the speed-up conveyor being removed for clarity.

FIG. 7 is a section view taken substantially in the plane of line 7—7 on FIG. 5.

FIG. 8 is a sectional top plan view taken substantially in the plane on line 8—8 of FIG. 7.

FIG. 9 is an enlarged perspective view of a wiener carriage of the continuous conveyor.

FIG. 10 is a bottom plan view of the hood and grill of the present invention, a wiener being shown before and after passage along the heated grill.

DESCRIPTION OF THE PREFERRED EMBODIMENTS

A wiener scorer 10 embodying the present invention (FIG. 1) includes a heated grill 20 superimposed over a belt conveyor 22 adapted to fit into a conventional wiener production facility in order to place a continuous score mark or grill stripe around the circumference of a tubular-shaped wiener 12 (FIG. 10), carried by a continuous conveyor 16. In the conventional wiener production facility, a precooked and preformed wiener 12 is conveyed to a loader 14 (FIG. 2). From the loader the wieners 12 are individually transported to a packager 18 by a continuous meat conveyor 16. The scorer 10 of the present invention is associated with the continuous conveyor 16 (FIGS. 1 and 5).

As the wieners 12 are carried along a predetermined path by the continuous conveyor 16, the scorer 10 intercepts the wieners. The belt conveyor 22 (FIG. 6), located adjacent and below the continuous conveyor, raises the wieners above their supported position on the continuous conveyor 16, and into rotational contact with the heated grill 20 of the scorer superimposed over the continuous conveyor.

The grill 20 is heated to a temperature of approximately 500 degrees Fahrenheit by electrical current flowing through straight, parallel wire members 24 of the grill (FIGS. 1 and 10). The wire members are therefore of conventionally available formable heating cable.

It is important, in order to achieve a wiener 12 having a continuous spiral or barber-pole stripe winding along its length, that the angle the wire members 24 make with the predetermined path of the wiener be adjustable. As the wieners rotate against the parallel wire members, the score mark made by one wire member on the wiener must match the score mark made by the wire members adjacent either side thereof. It can therefore be seen that, because tubular meat products vary in diameter, both the angle the wire members 24 make with the path of the wieners, but also the distance over which rotational contact is made between the wiener and the wire member are important.

The continuous conveyor 16 can be like model G(614-YBW) manufactured by Warrick Manufacturing Company of Cincinnati, Ohio. The continuous conveyor includes a pair of parallel continuous chains 17 spanning the distance between a pair of coaxial sprockets (not shown) (FIGS. 1 and 5). Every one and a half pitches the chains 17 have an upwardly extending mounting 19 which pivotally connects to a depending portion 23 of a generally "L" cross sectionally shaped carriage 25 (FIG. 9). The carriages are incrementally spaced along the entire length of the continuous chains and are supported along the path of conveyance by a main tubular support 27 of generally rectangular cross section, which tubular support extends between the parallel chains 102.

The carriage 25 includes a vertical leg 26 and a horizontal leg 28. The vertical leg 26 trails the path of movement of the continuous conveyor 16 and keeps the wiener, supported on the carriage 25, from rolling out of position. The horizontal leg 28 supports the wiener as it moves along the path of the continuous conveyor 16. The horizontal leg 28 is modified by the addition of three belt passageways 29 allowing the belt conveyor 22 to protrude above the level at which the horizontal leg 28 supports the wieners. The passageways are not a part of the conventionally available continuous conveyor.

The grill 20 of the scorer 10 is adjustably mounted, both angularly and longitudinally with respect to the path of conveyance, on a hood 21 (FIGS. 1, 3, 5 and 7) of trapezoidal cross section to the path of travel of the continuous conveyor 16. The hood is substantially open downward toward the continuous conveyor 16, over which conveyor the hood 21 is superimposed. The hood is movable between a lowered position in which production of striped wieners 12 occurs (FIG. 4 and 7), and a raised position (FIG. 1). The raised position provides access to the continuous conveyor or can be used to take the scorer 10 off line for processing of conventional wieners without score marks. The belt conveyor 22 (FIG. 6) includes a lead generally cylindrical roller 30, which lead roller is first to receive the wieners 12 along the path of the continuous conveyor 16, and a trailing generally cylindrical roller 32. Both the lead and trailing rollers are rotatably mounted transverse to and slightly below the path of the continuous conveyor 16. Each of the rollers 30 and 32 has three belt grooves 34 which are formed or machined into the surface of the roller at incremental spaces along the length thereof. Three belts 36 are positioned on the two rollers 30 and 32 in the respective belt grooves and extend continuously therebetween. When the belts 36 are stretched between the rollers and in the grooves, the belts are of oval configuration when viewed along the rotational axis of the rollers (FIGS. 5 and 6). The belts must be flexible so as to follow the circular surface of the rollers as the rollers are turned. The belts are preferably made of flexible metal that resists heat damage and does not allow the wiener 12 to slip relative thereto.

A belt leveler plate 38 (FIG. 6) is positioned between the rollers 30 and 32 in order to insure that the belts 36 remain level and do not sag, permitting the wiener 12 to fall out of contact with the grill 20. The lead roller 30 is rotatably driven by a variable speed roller drive 40. Variation of the rotational speed of the rollers is necessary in order to synchronize the relative velocity of the belts 34 to that of the continuous conveyor 16.

The manner in which the lead roller 30 and a trailing roller 32 are mounted allows for adjustment of the distance between the rollers, which adjustment allows for variation of the distance over which the wiener 12 is contacted by the grill 20. Each of the rollers 30 and 32 has a pair of supporting pivot rods 42 extending axially out either end thereof (FIGS. 1, 4, 5 and 7). The lead roller 30 is rotatably supported by the pivot rod 42 onto a pair of first mounting blocks 44 positioned a slight distance either side laterally of the continuous conveyor 16. The first mounting block is of generally "T" plan view having an extension 45 protruding toward the trailing roller 32 (FIGS. 1 and 5). A pair of second mounting blocks 46 rotatably receive the pivot rods 42 of the downstream roller 32 at the same lateral position, relative to the continuous conveyor 16, as the first mounting blocks. The second mounting block is of generally U-shaped or bifurcated plan view, having an upper arm 48 and a lower arm 50 extending toward the lead roller 32 and receiving therebetween the extension 45 of the first block 44.

Adjustment of the distance between the rollers 30 and 32 along the path of the continuous conveyor 16 is accomplished by sliding the first mounting blocks 44 relative to the second mounting blocks 46 along the extensions 45 of the first mounting blocks. The mounting blocks 44 and 45 are interconnected by a bolt 52 (FIG. 5) which passes through a slot 54 in the lower arm 50 of each second mounting block. A threaded bore 56 in the extension 45 of the first mounting block receives the bolt 52. Tightening of the bolt fixes the position of the first mounting block relative to the second mounting block. It will be understood that, as the distance between rollers 30 and 32 is altered, different sized belts 36 will have to be utilized in the belt conveyor 22.

The entire belt conveyor 22 is mounted on the continuous conveyor 16 in a notch 58 (FIGS. 1 and 5) machined or formed in the main tubular support 27 of the continuous conveyor 16. A scorer frame 62 supports the belt conveyor 22 and is rigidly mounted transverse the path of the continuous conveyor 16 in the notch 58 on the main tubular support 27 (FIGS. 1 and 5). The scorer frame is a generally flat plate extending beneath the belt conveyor 22, across the continuous conveyor 16 (FIG. 7). The scorer frame extends a relatively short distance, compared to the width of the continuous conveyor, laterally away from the main tubular support 27.

A tie-down bolt 64 rigidly connects the belt conveyor 22 to the scorer frame 62 and extends through the frame 62 (FIG. 5). The tie-down bolt is received by a threaded bore 66 in the extension 45 of each first mounting block 44. A pair of nuts 68 are threaded onto the tie-down bolts on either side of the frame 62 to anchor the first mounting block 44, and the second mounting block 46 connected thereto, to the frame.

The mounting blocks 44 and 46 are separately levellable, so that contact between the wieners 12 and the grill 20 can be maintained, by roller levelling bolts 70 that are threadably received into each mounting block at the approximate location of the pivot rods 42 (FIGS. 1 and 5). A head 72 of each of the bolts rests on the top surface of the frame 62 so that the vertical position of the belt conveyor 22, relative to the continuous conveyor 16, can be adjusted by advancing or retracting the roller levelling bolts 70.

The hood 21 is also supported by the scorer frame 62. On one side of the frame 62 projecting laterally away from the continuous conveyor 16, are mounted a pair of hood support posts 72 (FIGS. 1 and 7). At the uppermost extension of the support posts 72 is located a hinge 74 pivotally connecting the hood support posts to the hood 21. The hinges 74 are of the type that allow pivotal movement through a specific range, so that the hood can be pivoted downward in superimposed relationship to the continuous conveyor 16 (FIG. 7). At the hood's uppermost pivotal position it is held in an essentially upright position (FIG. 1). A handle 78 is utilized for raising and lowering the hood.

The hood 21 supports a fan 76, which fan exhausts excess heat through the top of the hood and away from the wieners 12 and grill 20 (FIG. 3). The wieners 12 are not burned or further cooked by the heated wire members 24. The wire members only place the grill stripe on the wieners.

Four slots 80 in the hood 21 support the grill 20 and are used in both angular and longitudinal adjustment of the wire members 24 relative to the path of the continuous conveyor 16. The slots 80 are formed in the hood generally at the corners thereof and along center lines parallel to the path of movement of the continuous conveyor 16 (FIGS. 1 and 10). A stationary grill support rod 81 supports one end of the wire members 24 and is mounted across the hood, transverse to the path of the continuous conveyor 16, between two of the slots 80. An adjustable grill support rod 83 supports the other end of the wire members and is mounted in a similar manner between two slots 80.

Longitudinal adjustment of the grill 20 to vary the distance over which a wiener 12 travels in contact with the heated wire members 24 is accomplished by adjusting the distance between rollers 30 and 32, already discussed, or by adjusting the extent to which the wire members overlap the belt conveyor 22. This latter adjustment is made by sliding the fixed support rod 81 and adjustable support rod 83 along the slots 80 through which the rods 81 and 83 are mounted to the hood 21.

The grill 20 can therefore be moved so that more or less of the length of the grill members 24 is directly superimposed over the belts 36 of the rollers 30 and 32. A pair of bolts 100 are threadably received in both ends of the tubular fixed rod 81 and manually tightened against the hood 21 to fix the longitudinal position of the fixed support rod 26 relative to the hood 21 and belt conveyor 22.

The adjustable rod 83 also slides along slots 80 in cooperation with fixed rod 81 to fix the overall position of the grill 20 relative to the belt conveyor 22. An elongated cylindrical prong 86 is received by one end of the tubular adjustable rod 83 (FIGS. 1 and 10). The prong has a threadable end 88 which extends through one of the slots 80 in the hood 21. A pair of nuts 90 are tightened against the hood 76 to fix the position of the prong and therethrough the adjustable rod 83. The other end of the adjustable rod 83 is threadably engaged by a screw 92 which passes through the slot 80 opposite the slot the prong 86 passes through, and rigidly connects to a knob 94, exteriorly displaced with respect to the hood 21. Therefore, both the fixed and adjustable rods 81 and 83 cooperatively move along the path of the continuous conveyor in the slots 80 to adjust the amount of overlap between the grill 20 and the belt conveyor 22. This amount of overlap determines the distance over which the wieners 12 will be placed into contact with the wire members 24.

Each alteration of the overlap between the wire members and the belt conveyor 22 has a corresponding change in the acute angle the wire members 24 make with a wiener 12 advancing along the continuous conveyor 16 to form a continuous stripe on the wiener. Adjustment of the angle of incidence at which the wiener 12 contacts the wire members 24 is made possible by moving the adjustable grill support rod 83 transverse to the path of the continuous conveyor 16.

In order that the wire members 24 be angularly adjustable relative to the path of the continuous conveyor 16, the wire members 24 are pivotally mounted at one end by rivets 82 to the stationary grill support rod 81 (FIGS. 1 and 10). The other end of each wire member is pivotally mounted by rivets 84 to the adjustable grill support rod 83. Elongated apertures 86 in the wire members 24 pivotally connect to the rivets 84 and provide a slideable connection between the rod 83 and wire members 24 so that the wire members retain their shape during pivotal movement. The apertures 86 therefore allow transverse movement of the adjustable grill support rod either right or left relative to the path of the continuous conveyor, and simultaneously pivotal movement of the wire members 24 about the rivet 84.

In initially adjusting the angle of the wire members 24, the nuts 90 of the prong 86 are loosened with respect to the hood 21. A collar 96 rotatably retains the screw 92 so that the screw rotates, but does not advance or retract relative to the hood 21. Rotation of the knob 94 and connected screw moves the adjustable rod 83 relative to the screw 92 in a direction transverse to the path of conveyance and thereby, through the pivotal connections at 82 and 84, changes the angle between the wire members 24 and the fixed and adjustable support rods 81 and 83.

Referring to FIG. 10, it will be seen that contact by the wiener 12 with the wire member 24a will end at approximately the pivotal connection at rivet 82. A second stripe will be placed on the wiener by wire member 24b which will start to place the stripe at approximately pivotal connection 84 and will terminate the scoring process at pivotal connection 82 of wire member 24b. The stripe placed on the wiener by wire member 24a and ending at pivotal connection 82 must coincide with the grill stripe placed on the wiener by wire member 24b starting at pivotal connection 84. If this precise alignment is achieved, a continuous barber-pole or spiral stripe will run the length of the wiener.

To illustrate the operation of the above described apparatus, the continuous conveyor 16 transports conventional wieners 12 weighing about 1.6 ounces each and having a diameter of about 0.826 inches and a circumference of about 2.56 inches. The rate of transport, at eighty-five percent of top speed of the continuous conveyor, is about 510 wieners per minute, or 510 in./min. continuous conveyor speed. In such case, the belt conveyor 22 moves at about 2½ times the continuous conveyor speed, or about 1275 in./min., to rotate the wieners one complete revolution against the grill 20 while transporting the wieners in synchronous relationship to the continuous conveyor. The length of the grill contact is set at 2.75 inches, slightly more than the circumference of the wiener, to allow for size variations between wieners. Over the 2.75 inches, the wire members 24 makes an angle of 20° relative to the path of movement of the continuous conveyor. The operation will be similar, with appropriate adjustment, for other sizes of wieners or sausages.

It will be seen that the angle of incidence of the wire members 24 and length of the wire member that is superimposed over the belt conveyor 22, which establishes the length of wire members which contact the wiener 12, are important to achieving a continuous barber-pole stripe or score on a wiener. It is also noted that the grill members are spaced about one inch apart. This spacing of wire members does well for wiener products that vary in diameter from 12 mm to 40 mm and are approximately 127 mm in length. For smaller products like link sausages which vary in length, the scorer 10 would be dimensioned differently or the sausage would be turned twice over the length of contact to achieve the desired continuous barber-pole stripe.

An alternative embodiment is seen in FIG. 4, like numbers being given prime suffixes. The belt 36' and rollers 30' and 32' are placed in a superimposed position above the continuous conveyor 16', rather than in underlying relationship therewith. The grill 20' is therefore placed beneath the continuous belt 36'. The grill 20' is shown as an integral unit rather than incorporated into the hood 21'.

The carriages 25' of the continuous conveyor are modified by removing the horizontal leg 28', allowing the wiener 12 to roll on the grill 20' with minimal interference. The wieners 23 would have to be independently moved to the grill 20' by a continuous belt 113 turned by a roller 116. Once received by the grill 20', the operation of the scorer 10' is exactly as described previously for the scorer 10, with the exception of the inverted positioning of the elements thereof. Once the grill stripe has been applied, a second roller 115 carrying another continuous belt 113 independently receives the wieners 12 for movement to the packager 18. It is seen that the belts 113 are required because of the removal of the horizontal legs 28. Absent the belts, the wiener would not be supported as it moved along the continuous conveyor 16'.

Though the invention has been described with a certain degree of particularity, nothing contained herein shall serve to limit the scope of the invention, particularly as described in the appended claims.

What we claim is:

1. An apparatus for placing at least one grill stripe on a tubular meat product of circlar transverse cross section, said apparatus operably connected to a meat product conveyor so as to receive individual tubular meat products from said meat product conveyor, which meat product conveyor conveys said tubular meat products at incremental spaces along a predetermined path comprising, in combination:
   means for scoring at least one grill stripe around the circumference of said meat product; and
   means for placing said meat product into contact with said means for scoring said grill stripe, said means for placing said meat product into contact receives said meat product from said meat conveyor and moves said meat product translationally and rotationally along said means for scoring a grill stripe over a predetermined distance along said meat product conveyor.

2. The invention defined in claim 1 wherein said means for scoring said grill stripe further includes means for scoring a continuous grill stripe along the length of and around the circumference of said meat product.

3. The invention defined in claim 1 wherein said means for placing said meat product into contact with said means for scoring said grill stripe further includes:
   a pair of generally cylindrical rollers rotatable about axes perpendicular to the path of said meat product conveyor, said rollers further being associated with the path of said meat product conveyor;
   at least two belts mounted on said rollers, said belts protruding slightly above the path on which said meat product conveyor supports said meat product, said belts adapted to protrude above said meat product conveyor, placing said meat product into rotational and axial contact with said means for scoring a grill stripe on said meat product, said belts further having a positive relative velocity compared to a velocity of said meat product conveyor; and means for rotatably driving said rollers.

4. The invention defined in claim 3 further including means for leveling said belts between said rollers.

5. The invention defined in claim 3 further including: means for adjusting the distance between said rollers.

6. The invention defined in claim 5 wherein said means for adjusting the distance between said rollers further includes:
- a generally flat rectangular frame mounted on said continuous conveyor, said frame fixed in position below said roller and said belts;
- a pivot rod extending concentrically out of both ends of each of said rollers;
- a first mounting block having an extension thereon, said first block pivotally mounting each end of one of said pivot rods, said extension directed toward the other pivot rod, said extension further having a threaded bore therein;
- a second mounting block having an upper arm and a lower arm of generally U-shape, said second block pivotally mounting each end of said other pivot rod, said arms of said first block directed toward the one pivot rod, said lower arm of said first block further having a slot along a portion of the length thereof;
- a bolt passing through said slot of said lower arm of said second block into the bore of said first block fixing the position of said first block relative to said second block; and
- means for connecting said first and second blocks to said frame.

7. The invention defined in claim 6 further including means for adjusting the protrusion of said belts above the path on which said meat product conveyor supports said meat product.

8. The invention defined in claim 3 further including means for adjusting the protrusion of said belts above the path on which said meat product conveyor supports said meat product.

9. The invention defined in claim 7 or 8 wherein said means for adjusting the protrusion of said belts further includes:
- a generally flat rectangular frame mounted to said meat product conveyor, said frame fixed in a position below said rollers and belts;
- a pivot rod extending concentrically out of both ends of each of said rollers;
- a generally rectangular first block having a threaded bore therein, said first block pivotally mounting each end of one of said pivot rods;
- a generally rectangular second block having a threaded bore therein pivotally mounting each end of said other pivot rod, said second block being connected to said first block;
- a bolt threadably received in the bore of the first and second blocks, said bolt having a head bearing on said frame; and
- means for connecting said first and second blocks to said frame.

10. The invention defined in claim 9 further including means for adjusting the distance between said rollers.

11. The invention defined in claim 1 wherein said means for scoring a grill stripe on said meat product further includes:
- a grill having parallel individual wire members extending in substantially longitudinally aligned relationship with the path of said meat product conveyor; and
- means for applying electrical current to said wire members.

12. The invention defined in claim 11 wherein said meat product conveyor further includes:
- a continuous conveyor transporting said meat product along a linear path; and
- a plurality of carriages incrementally spaced along the length of said continuous conveyor, said carriages mounted on said continuous conveyor and adapted to support said meat product.

13. The invention defined in claim 12 wherein said carriages have a horizontal leg and a vertical leg defining a generally L-shaped transverse cross section to the continuous conveyor path, said carriage further having passageways in said horizontal leg aligned with the path of said continuous conveyor and through which passageways said belts protrude.

14. The invention defined in claim 11 wherein said grill further includes:
- a hood on which said grill is mounted, said hood movable to a position removed from said meat product conveyor;
- means for altering the alignment of said grill wire members with respect to the path of said meat product conveyor; and
- means for moving the longitudinal position of said grill wire members along the path of said meat product conveyor of said grill.

15. The invention defined in claim 14 wherein said means for altering the alignment of said grill members includes:
- a pair of parallel rods transverse to the path of said meat product conveyor, said rods pivotally connecting to said wire members, one of said rods being slideably connected to said wire members; and
- means for advancing or retracting said one rod along the line generally transverse to the path of said meat product conveyor.

16. The invention as defined in claim 14 wherein said means for moving the position of said grill further includes:
- a pair of parallel rods transverse to the path of said meat product conveyor, said rods operatively connected to said grill members; and
- a threadable connection between said rods and said hood, said threadable connection slidable along slots in said hood aligned with the path of said meat product conveyor.

17. The invention defined in claim 14 further including means for exhausting radiated heat from said grill.

18. An apparatus for placing at least one grill stripe on a meat product of circular transverse cross section conveyed along a predetermined path by a continuous conveyor, said continuous conveyor having carriages incrementally spaced along the length thereof for supporting meat products of circular transverse cross section to the path of said continuous conveyor, comprising in combination:
- a frame connected to said continuous conveyor at a fixed position below said continuous conveyor;

a pair of generally cylindrical driven rollers mounted to said frame on pivot rods, said pivot rods extending transverse the path of said continuous conveyor;

at least two belts mounted between said rollers along the path of said continuous conveyor, said belts extending above the path of said carriages of said continuous conveyor, said belts further moving at a positive linear velocity relative to the velocity of said continuous conveyor; and a heated grill having grill members running substantially parallel to the path of said continuous conveyor, said grill supported in a superimposed relation above said continuous conveyor and said rollers and belts whereby said meat product is placed in rotational contact with said grill when said meat product is supported by said belts.

19. The invention defined in claim 18 wherein each of said carriages further include:

a horizontal leg and a vertical leg defining an L-shaped cross section to the continuous conveyor path;

a generally rectangular depending mounting at either end of said horizontal leg, each mounting connected to said continuous conveyor; and passageways aligned with the path of said continuous conveyor adapted to permit said belts to extend above said horizontal leg.

20. The invention defined in claim 18 further including means for adjusting the distance between said pivot rods of said rollers in a direction along the path of said continuous conveyor.

21. The invention defined in claim 18 further including means for adjusting the distance said belts extend above the path of said carriages of said continuous conveyor.

22. The invention defined in claim 18 further including means for adjusting an angle of incidence said grill members make with the path of said continuous conveyor.

23. The invention defined in claim 22 further including means for adjusting the length along the path of said continuous conveyor in which said meat product contacts said grill members.

* * * * *